United States Patent [19]

Wesson

[11] Patent Number: 4,466,295

[45] Date of Patent: Aug. 21, 1984

[54] PHOTOELASTIC SENSING MEANS

[75] Inventor: Laurence N. Wesson, Collegeville, Pa.

[73] Assignee: TRW Inc., Redondo Beach, Calif.

[21] Appl. No.: 420,003

[22] Filed: Sep. 20, 1982

[51] Int. Cl.³ ............................................. G01L 1/24
[52] U.S. Cl. .................................. 73/862.38; 73/517 R;
73/653; 73/705; 73/800; 324/208; 350/371;
356/33; 374/188
[58] Field of Search ................ 73/862.38, 862.64, 705,
73/800, 653, 655, 517 R; 374/161, 163, 188;
356/33-35; 350/96.13, 371, 373; 324/208

[56] References Cited

U.S. PATENT DOCUMENTS

| 3,645,603 | 2/1972 | Smith | 350/371 |
| 3,950,987 | 4/1976 | Slezinger et al. | 73/862.64 |
| 4,010,632 | 3/1977 | Slezinger et al. | 73/862.38 |
| 4,123,158 | 10/1978 | Reytblatt | 73/800 X |
| 4,207,000 | 6/1980 | Miller | 356/33 |
| 4,342,907 | 8/1982 | Macedo et al. | 73/800 X |

FOREIGN PATENT DOCUMENTS 398841  4/1974  U.S.S.R. .................... 356/33

OTHER PUBLICATIONS

W. B. Spillman, Jr.–"Multimode Fiber-Optic Accelerometer Based on the Photoelastic Effect"–Applied Optics, vol. 21, No. 15, Aug. 1982.
D. H. McMahon–"Sperry Intensity Modulation Hydrophone", Summaries Tri-Service Workshop on Fiber Optic Sensors and Guided Wave Tech.–Oct. 1982.
T. H. Korth–"Integrated Optical Force and Stress Sensor–IBM Tech. Disc. Bul., vol. 24, No. 2, Jul. 1981.

*Primary Examiner*—Charles A. Ruehl
*Attorney, Agent, or Firm*—Lawrence S. Cohen; Jacob Trachtman; John T. Wiedemann

[57] ABSTRACT

Photoelastic sensing means, and more particularly photoelastic sensing means capable of providing high sensitivity for measuring pressure, force, displacement, acceleration or inertial force, proximity, temperature and other measurands. The photoelastic sensing means comprises a thin photoelastic member of transparent material having closely spaced top and bottom outer surfaces with peripheral edges and an edge surface extending between the peripheral edges of the other surfaces. Light flux is provided to the edge surface of the member at a first region for transmission by the member along a path to a second region at the edge surface where it is received and detected. The spacing between the top and bottom outer surfaces of the member is relatively small compared to the length of the path of the light flux in the member. The member is supported to produce bending stresses in the member in a direction transverse to the path of the light flux in the member with the application of force to the member. An output signal is provided responsive to the force which produces the stress in the member.

44 Claims, 23 Drawing Figures

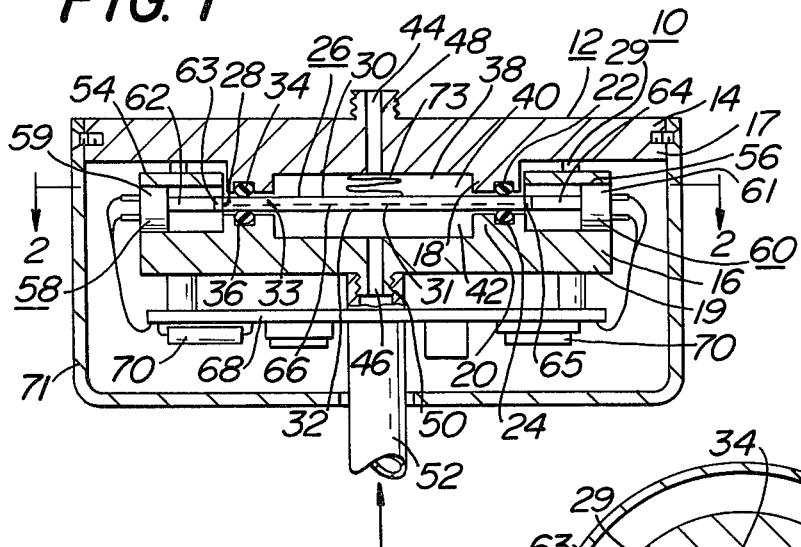
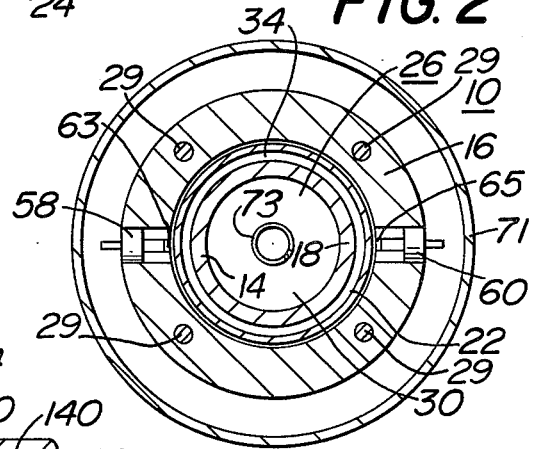
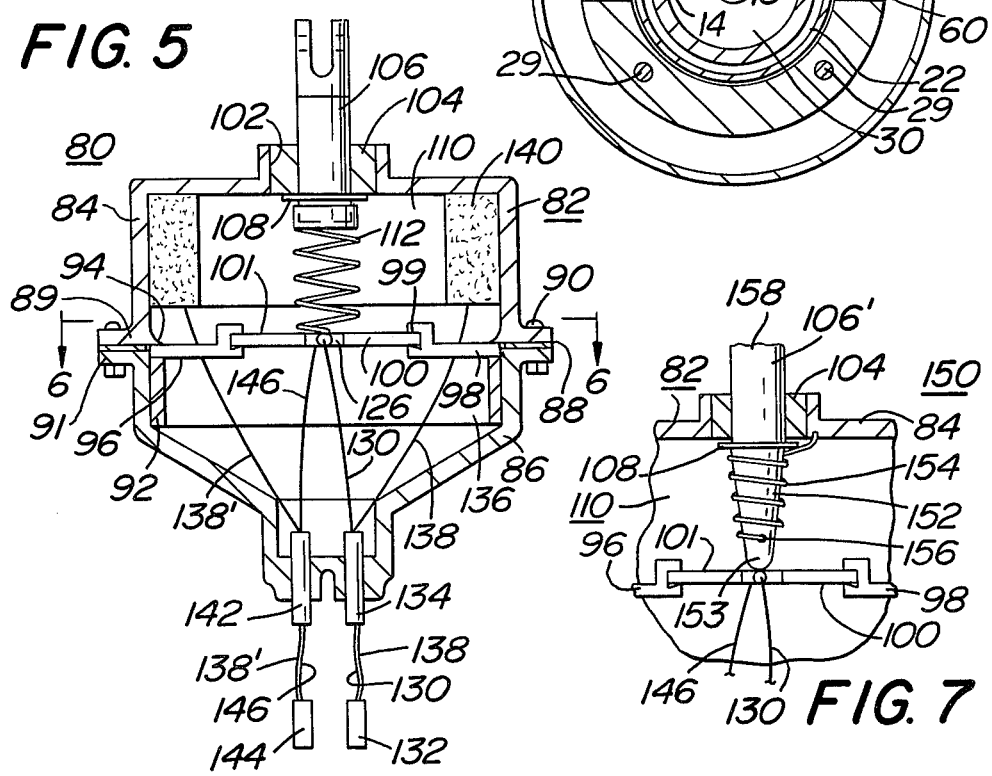

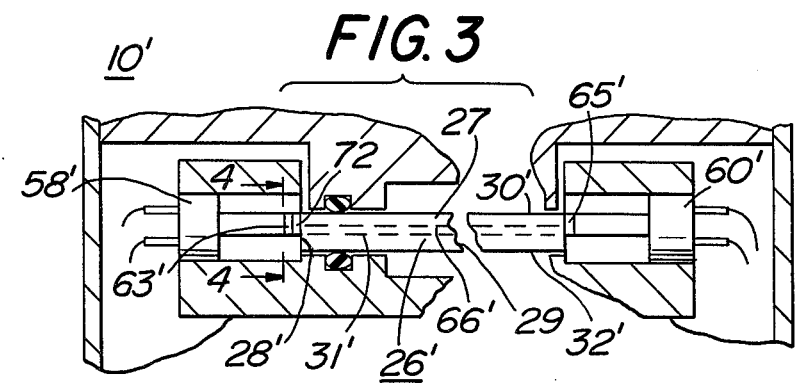
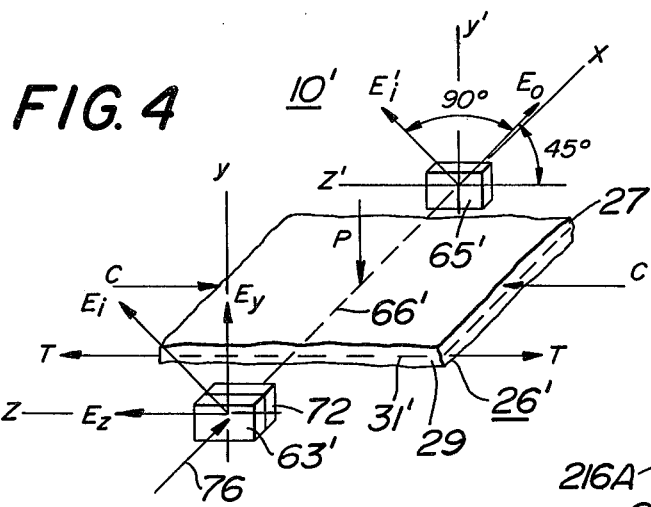
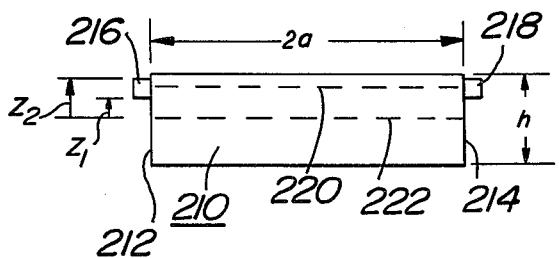
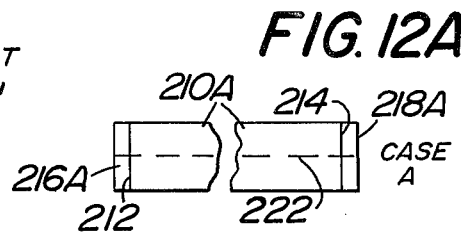
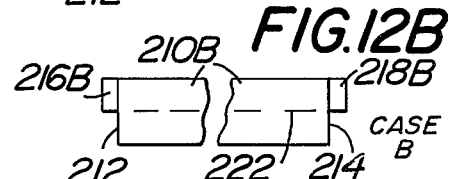
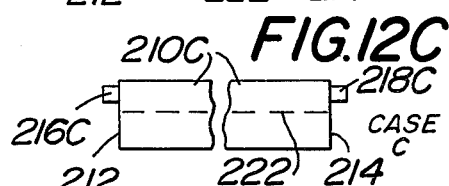
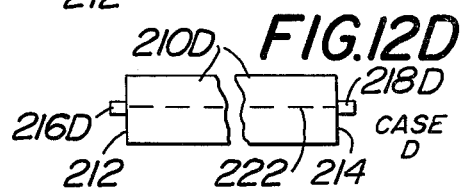

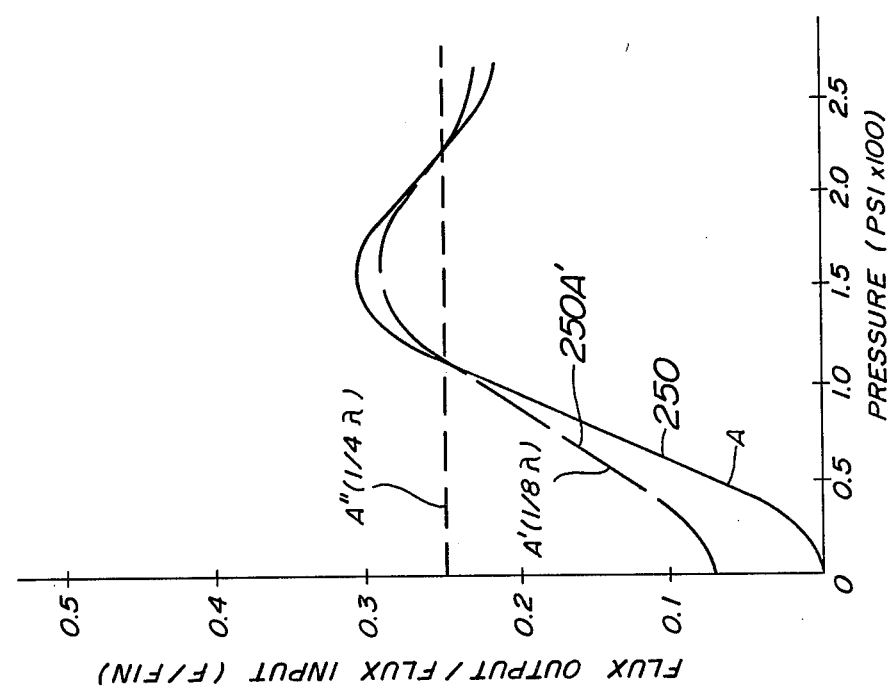
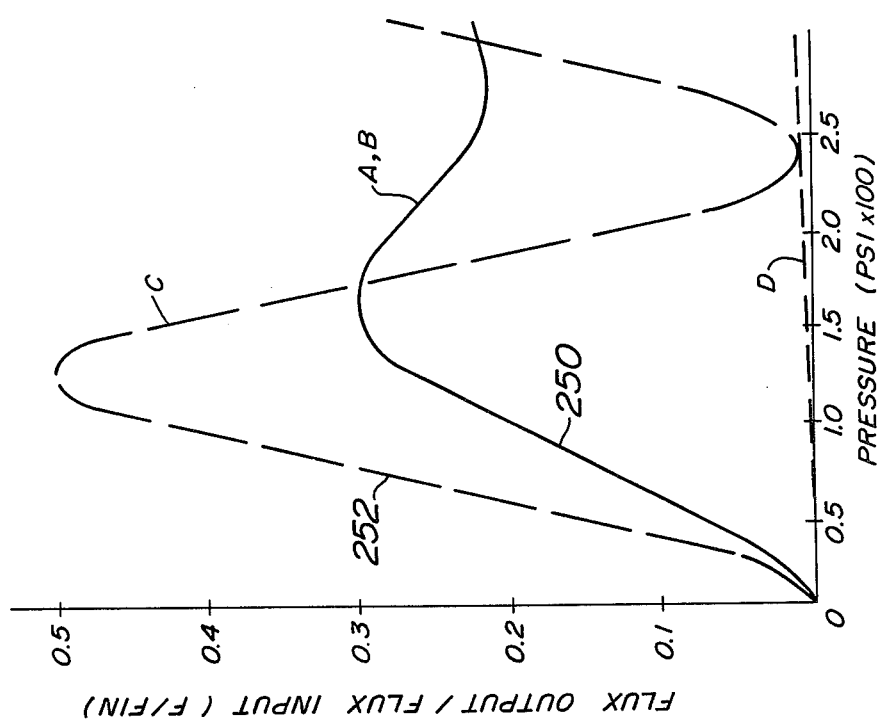

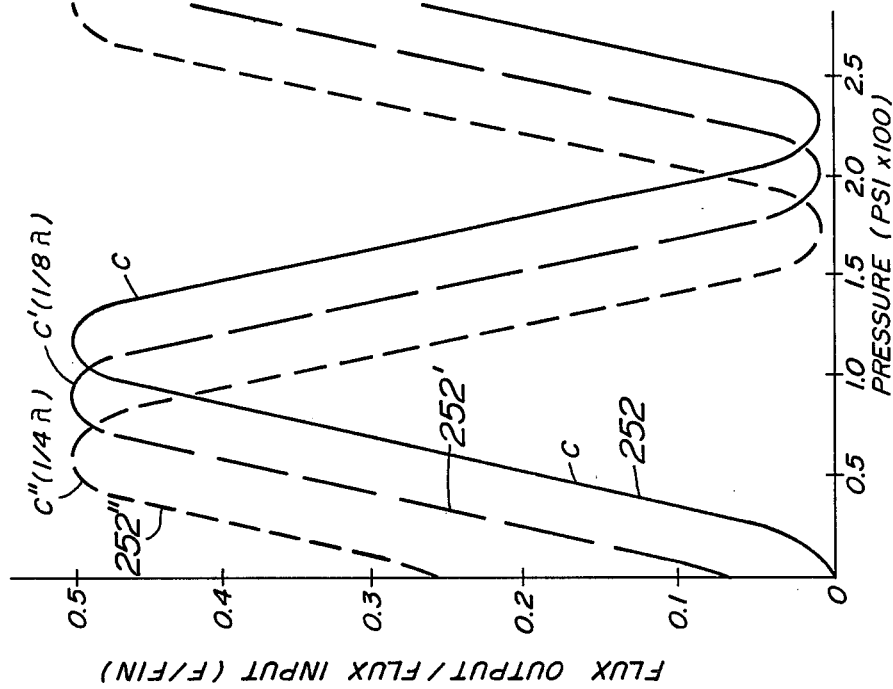
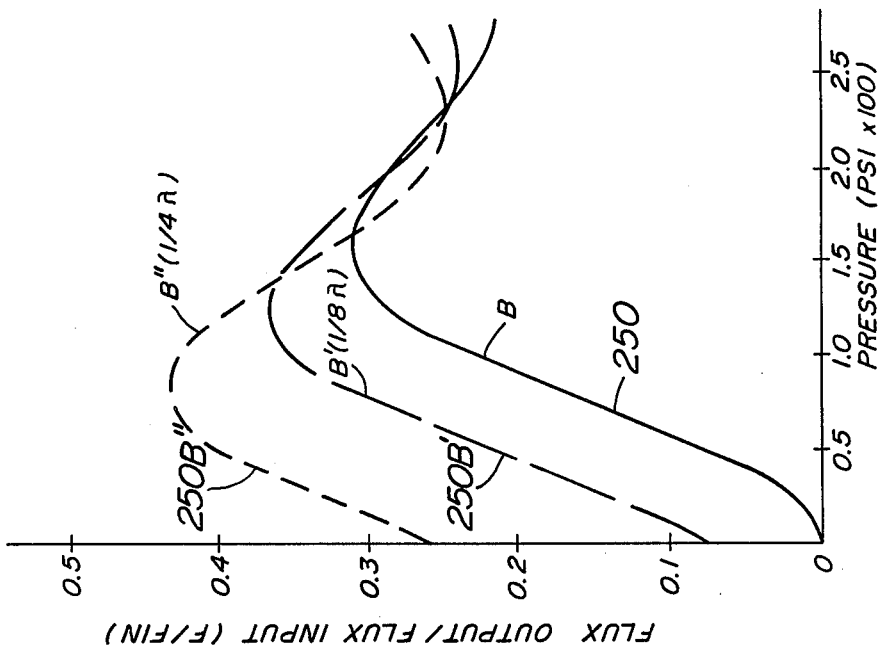

VACUUM SENSOR
OUTPUT VOLTAGE vs VACUUM PRESSURE

HIGH PRESSURE SENSOR
OUTPUT VOLTAGE vs PRESSURE

PRESSURE SENSOR
OUTPUT VOLTAGE vs PRESSURE

FORCE SENSOR
OUTPUT VOLTAGE vs FORCE

PHOTOELASTIC SENSING MEANS

BACKGROUND OF THE INVENTION

The invention relates to photoelastic sensing means, and more particularly to photoelastic sensing means capable of providing high sensitivity for measuring pressure, force, displacement, acceleration or inertial force, proximity, temperature and other measurands.

Sensing devices and transducers in which the variation of stress in a sensing member provides a corresponding electrical output are known in the art. Such devices include strain gauges, magnetoelastic measuring transducers, piezo-transister measuring transducers, optical measuring transducers, and photoelastic measuring transducers. The deficiences of such prior art devices included providing small output signals, having limited frequency response characteristics for dynamic measurements, having poor signal to noise characteristics, being unable to provide high sensitivity for various ranges of measurements, and being complex and difficult to construct and operate. Thus, the piezo-optic or photoelastic measuring transducer described in U. S. Pat. No. 3,950,987 of Isaak Isaevich Slezinger et al requires a plurality of polarization-optical channels in special arrangements and with phasing means for each channel in order to produce a plurality of output signals which are compared to provide the output information. The requirement for such multiplicity of channels and components increases the complexity and the cost for manufacture and maintenance of the photoelastic transducer. This transducer also does not provide the very high sensitivity desirable for measuring low level pressures and forces applied to the photoelastic sensing means.

SUMMARY OF THE INVENTION

It is therefore a principal object of the invention to provide a new and improved photoelastic sensing means which is highly sensitive to input pressures and forces for providing output signals.

Another object of the invention is to provide a new and improved photoelastic sensing means which is highly versatile and adaptable for providing output signals measuring pressure, force, displacement, acceleration or inertial force, proximity, temperature and other measurands.

Another object of the invention is to provide a new and improved photoelastic sensing means of high sensitivity which does not require utilization of more than one polarization optical path for providing the desired results.

Another object of the invention is to provide a new and improved photoelastic sensing means in which the characteristics of the sensing means may be adjusted to provide the desired sensitivity and operating conditions.

Another object of the invention is to provide a new and improved photoelastic sensing means which requires a minimum number of components for obtaining the desired sensitivity and mode of operation.

Another object of the invention is to provide a new and improved photoelastic sensing means which may be designed to provide an output signal which is linearly related to the input signal over a predetermined range.

Another object of the invention is to provide a new and improved photoelastic sensing means which can be designed to provide output signals for the desired range of magnitudes, either small or large of the measurand.

Another object of the invention is to provide a new and improved photoelastic sensing means providing high sensitivity by using a thin photoelastic member with a relatively long light flux path therethrough.

Another object of the invention is to provide a new and improved photoelastic sensing means utilizing a photoelastic member as a diaphragm which is subjected to applied pressure or force for providing output signals.

Another object of the invention is to provide a new and improved photoelastic sensing means having a photoelastic member of low mass and capable of providing high frequency response to dynamic input signals being measured.

Another object of the invention is to provide a new and improved photoelastic sensing means providing a closed optical path which is not affected by the environment including electromagnetic radiation, corrosion, heat, and dirt or foreign particles.

Another object of the invention is to provide a new and improved photoelastic sensing means which is compatible with fiber-optic systems, and can be completely non-metallic.

Another object of the invention is to provide a new and improved photoelastic means which does not require high tolerance and may be easily constructed.

Another object of the invention is to provide a new and improved photoelastic sensing means which may be inexpensively manufactured to design requirements for providing output signals for various measurands, and which means is highly reliable and durable, and requires a minimum of maintenance.

The above objects as well as many other objects and advantages of the invention are achieved by providing a photoelastic sensing means comprising a thin photoelastic member of transparent material having closely spaced top and bottom outer surfaces with peripheral edges and an edge surface extending between the edges of the outer surfaces. First means provides light flux to the edge surface of the member at a first region for transmission by the member along a path through the member to a second region of the edge surface. The spacing between the top and bottom outer surfaces of the member is relatively small compared to the length of the path of the light flux in the member. Second means receives and detects light flux from the second region of the edge surface of the member and provides an output signal. Third means supports the member to produce bending stresses in the member in a direction transverse to the path of the light flux in the member with the application of force to the member. The output signal of the second means is responsive to the force which produces the stress in the member.

The first means provides polarized light flux having rectangular vector components in a plane perpendicular to direction of its propagation. The rectangular vector components of the light flux are respectively parallel and perpendicular to the direction of the stress in the member, and the second means detects changes in the respective rectangular components of the light flux which it receives for providing the output signal.

In one form, the photoelastic sensing means includes a housing having a cavity within which the member is supported along its peripheral edges by the third means, and the member partitions the cavity into first and second chambers. The housing includes respective openings communicating externally with the first and second chambers. Fluid may be provided through the openings to the chambers for applying force to the member, so that the photoelastic means provides an output signal responsive to the applied fluid forces. In another form, a rod element extends through one of the openings into the cavity of the housing for applying force to an outer surface of the member to provide an output signal by the second means related to the applied force.

Where desired, the member may be prestressed by a spring or other such means received within one of the chambers and exerting force on the member to produce bending stress therein. Under certain circumstances, effects similar to prestressing may be obtained by the use of phase delay plates in the polarization optical path between the first and second means. Operation over linear and non-linear regions of the characteristic output curve of the photoelastic sensing means may be controlled by the use of the prestressing means and phase delay plates. The output characteristics of the photoelastic sensing means may also be controlled by the path of the light flux through the photoelastic member, and depend upon whether the light path extends through both or only one of the tensile and compressive stressed layers of the member produced by the bending forces applied to the member.

In other forms, the photoelastic sensing means also provides embodiments for measuring acceleration or inertial force, proximity, relative position and motion of one body with respect to another, and temperature. With appropriate modification, the photoelastic sensing means may provide other physical measurements such as provided by barometers, altimeters, liquid pressure sensors, depth meters, liquid level sensors, microphones, speedometers, torque meters, as well as electric field and gravitational effects among others.

For a fuller understanding of the nature and objects of the invention, reference should be had to the following detailed description taken in connection with the accompanying drawing.

BRIEF DESCRIPTION OF THE DRAWING

FIG. 1 is a sectional view of a photoelastic sensing means embodying the invention, FIG. 2 is a sectional view taken on the line 2—2 of FIG. 1, FIG. 3 is a sectional view with portions broken away similar to that of FIG. 1 illustrating a modified form of the photoelastic sensing means, FIG. 4 is an enlarged perspective view taken on the line 4—4 of FIG. 3 with portions broken away, FIG. 5 is a sectional view of another form of the photoelastic sensing device embodying the invention, FIG. 7 is a partial sectional view showing a modified form of the photoelastic sensing means similar to that shown in FIG. 5.

Like reference numerals designate like parts throughtout the several views.

DETAILED DESCRIPTION OF THE INVENTION

Figure 6:
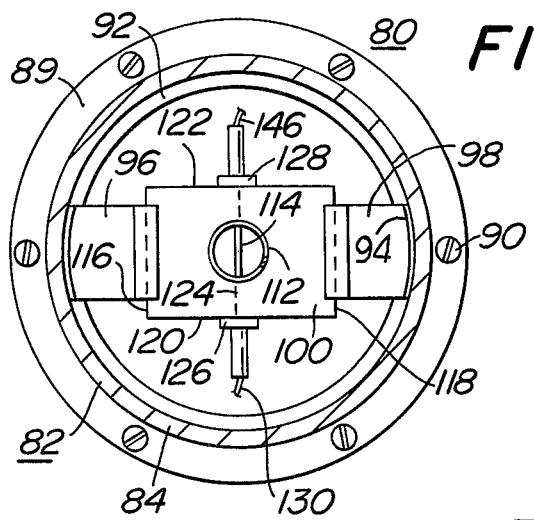
FIG. 6 is a sectional view taken on the line 6—6 of FIG. 5.

FIGS. 1 and 2 are sectional views illustrating a photoelastic sensing means 10 embodying the invention. The means 10 comprises a housing 12, which may be made of metal such as aluminum or suitable non-metallic material, having a top section 14 and a bottom section 16. The top section 14 of the housing 12 has a top cylindrical portion 17 with a downwardly extending ring portion 18, while the bottom section 16 also has a substantially cylindrical bottom portion 19 with a complementary ring portion 20 extending upwardly and opposite to the ring portion 18. Annular grooves 22 and 24 respectively provided in the ring portions 18 and 20 of the top and bottom sections 14 and 16 of the housing 12 correspondingly receive therein oppositely positioned upper and lower 0-rings 34 and 36.

A thin photoelastic member 26, made of transparent glass, epoxy or other suitable material for providing the desirable photoelastic effect, has top and bottom outer surfaces 30 and 32 with circular peripheral edges bordering a cylindrical edge surface 28 extending between the top and bottom outer surfaces 30 and 32. The member 26 is positioned between the top and bottom sections 14 and 16 of the housing 12 which are secured together by bolt means 29 so that the top and bottom surfaces 30 and 32 at the peripheral region 33 of the member 26 are clamped and sealed between the upper and lower elastic 0-rings 34 and 36. The peripheral region 33 of the member 26 extends between the sections 14 and 16 of the housing 12, so that the cylindrical edge surface 28 is externally exposed. A cavity 38 is formed within the top and bottom sections 14 and 16 of the housing 12 which is partitioned by the photoelastic member 26 into upper and lower chambers 40 and 42. The chamber 40 is sealed with respect to the chamber 42, each communicating externally of the housing 12 through respective openings 44 and 46. The top and bottom sections 14 and 16 may each be provided with threaded extensions 48, 50 and connected with means, such as the tubing 52 secured with the bottom extension 50, for providing fluid to the chambers 40 and 42 of the cavity 38.

An upwardly extending outer ledge portion of the bottom section 16 of the housing 12, supports within radially extending openings at diametrically opposite locations 54 and 56, respectively a source 58 for providing light flux and a light flux detector 60. The light source 58 may be a light emitting diode 59 providing light of a given frequency, such as the Motorola MF OE 102F IR emitter, and the light detector 60 may be a detector diode 61, such as the Motorola MF OD 102F PIN photodiode, or other suitable devices. As commercially available, such diodes 59 and 61 may be provided with light coupling means 62, 64 in the form of a optical fiber elements for respectively transmitting light from the diode 59 to a selected region of the peripheral edge surface 28 of the member 26, and receiving light from the opposite region of the peripheral edge surface 28 of the member 26 for delivery to the detector diode 61.

The light flux provided by the diode 59 is delivered to the member 26 through a polarizer 63 and is propagated along a path 66 through the member 26 to the opposite region of the peripheral edge surface 28 for being delivered through an analyzer 65 to the detector diode 61. The path 66 of light flux through the member 26 is relatively parallel to the top and bottom outer surfaces 30 and 32 of the member 26, and the spacing between the top and bottom outer surfaces 30 and 32 of the member 26 is relatively small compared to the length of the path 66 of the light flux.

The light from the diode 59 upon passing through the polarizer 63 is filtered to provide linearly polarized light flux to the member 26. The polarized light flux can be represented by a vector with rectangular components in a plane perpendicular to the direction of flux propagation. The rectangular components are respectively parallel and perpendicular to stress produced in the member 26 with the application of force thereto. The light delivered to the detector diode 61 from the member 26, first passes through an analyzer 65 which passes only light flux which is polarized in a predetermined selected direction. The polarizer 63 and analyzer 65 which may be comprised of thin sheets of plastic material having polarizing properties, may be arranged so that their optical axes are crossed. With this arrangement, light flux passed by the polarizer 63 is in a direction which is rotated 90° from the direction of the light flux passed by the analyzer 65. Alternatively, the polarizer and analyzer may be arranged to pass light flux polarized in the same or in any other direction. The orientations selected for the polarizer and analyzer are determined by the output signal desired for the particular operating conditions of the photoelastic sensing means 10.

The body 26 is supported so that bending stresses produced in the body 26 are in the direction transverse to the path 66 of the light flux through the member 26 so that the parallel and perpendicular components of the light flux passing therethrough are affected differently depending upon the amount of stress. Thus, as the bending stresses produced in the member 26 change with the pressure or force exerted upon the member 26, the phase relationship of the components of the transmitted light flux will be correspondingly affected to alter the amount of light flux passed by the analyzer 65 to the detector diode 61 for correspondingly changing the output signal.

When force producing bending stress is applied to the member 26, shear stresses are induced in first and second layers thereof bounded by the outer surfaces 30 and 32 and separated by an intermediate neutral surface 31. One of the layers is under compressive stress, while the other is subjected to tensile stress. As illustrated in FIG. 1, the light flux delivered to the member 26 by light coupling means 62 may be along a path 66 extending through both the compressive and tensile layers for being thereafter received by the analyzer and delivered to the diode 61 for detection. Alternatively, the coupling means 62 may provide light flux to the edge surface 28 at a restricted region for transmission along a path 66 which extends only through the tensile or compression layer for delivery to the analyzer 65 and the detector 61. However, when the member 26 is extremely thin for obtaining high sensitivity, the area of the irradiated region of the peripheral edge 28 is so small, that insufficient light flux can be transmitted through only one layer to allow detection by the detector diode 61 for providing the desired sensitivity. The effects on the output signal when light flux is transmitted along a path which extends (a) through both stressed layers, and (b) through only a single stressed layer of the member 26, are considered in greater detail in connection with FIGS. 11 and 12.

The bottom section 16 of the housing 12 supports thereunder a circuit board 68 with various components 70 providing electrical circuitry for energizing the diode 59 for producing light flux and receiving and detecting signals from the detector diode 61 for providing the output signal of the photoelastic sensing member 10. The housing 12 is provided with a cup shaped cover 71 received over and enclosing the bottom section 16 and secured by screw means with the top section 14. The cover 71 is provided with a central opening for receiving therethrough the tubing 52 for connection with the threaded portion 50 of the bottom section 16 of the housing and means (not shown) is provided by the housing 12 for externally delivering from the electrical circuity the output signal produced by the photoelastic sensing means 10.

Although not essential for operation, it may be desirable to provide the member 26 with a prestressing force. This force may be produced by a coil spring 73 positioned within chamber 40, with one end engaging the top section 14 and the other end exerting the force on the top surface 30 of the member 26 at a location intermediate its secured peripheral region 33. Since the member 26 is mounted within the housing 12, so that its peripheral region 33 is secured between and sealed by the O-rings 34 and 36, the application of the force downwardly on the top surface 30 of the member 26 produces bending stresses within the member 26. The bending stresses are in the form of compressive stresses within the top layer and tensile stresses within the bottom layer of the member, the top and bottom layers being separated by a neutral plane or surface 31.

The bending stresses in the member 26 can also be provided by fluid under pressure delivered through the openings 44 and 46. When pressure is delivered through only one of the openings 44, 46, while the other is vented to the atmosphere, the output signal of the photoelastic sensing means 10 indicates gauge pressure. Barometric pressures may also be indicated by providing a constant pressure to one chamber, while allowing the other chamber to be vented to the atmosphere. Differences in pressure can be measured by the sensing means 10, by providing such pressures respectively to the chambers 40 and 42 to produce the output signal. The sensitivity of the photoelastic sensing means 10 can be affected by the thickness of the member 26, with the sensitivity increasing as the member 26 is made thinner. The range of force to be measured may also be accommodated by either increasing or decreasing the thickness of the member 26 for correspondingly increasing or decreasing the range. The prestressing force may also be utilized for obtaining measurements within a linear portion of the output characteristic curve for the desired range. Other means for obtaining such adjustment by use of phase delay plates are also considered in connection with the modified form of the sensing means shown in FIG. 3.

FIG. 3 is an enlarged fragmentary sectional view of a photoelastic sensing means 10' which is a modified form of the sensing means 10 of FIG. 1. Because of the similarities, only the difference in structure of the photoelastic sensing means 10' will be described in detail.

The photoelastic member 26' when subjected to bending stresses, provides tensile and compressive stresses respectively in the upper and lower layers 27, 29, or reversely, depending upon the direction of the net pressure applied to the member 26'. The dashed line 31' extending intermediately through member 26' represents the neutral plane or surface which separates the upper and lower layers 27 and 29 undergoing compressive and tensile stresses with the exertion of force or pressure on the outer surfaces 30' and 32'. The light flux produced by the light source 58' is delivered to the member 26' through a polarizer 63', and phase delay plate 72 which may provide a ¼ wavelength or other delay, depending upon the design requirements. The light flux after being delayed by the plate 72 is transmitted through the member 26' along a path 66' extending entirely within the upper layer 27 and is received by the detector 60' after passing through the analyzer 65'. The photoelastic sensing means 10' may also be provided with a prestressing means such as a spring 73, if desired. The phase delay plate 72 acts to shift the operating region of the device 10' to a region on the output response curve which may be linear or otherwise desirable, and in this respect provides an effect similar to that of the spring 73.

Refer to FIG. 4 for a consideration in greater detail of the transmission of light flux from the source 58' to the detector 60' along the path 66' of the member 26' of the sensing means 10' illustrated in FIG. 3. FIG. 4 diagrammatically illustrates the propagation of light flux in the direction of the x-axis shown by the arrow 76. The light flux passes in the x-axis direction through the polarizer 63' which is arranged to transmit polarized light flux having an orientation represented by the vector $E_i$. The vector $E_i$ is in the zy-plane which is normal to the x-axis and is displaced 45° from the y-axis, and 45° from the z-axis. The polarized light $E_i$ has a vertical component $E_y$ extending in the y-axis direction and a horizontal component $E_z$ extending in the z-axis direction. When a phase delay plate 72 is utilized, the polarized light flux $E_i$ from the analyzer 63 also passes therethrough. The phase delay plate 72 may be a ¼ wavelength delay, or other delay, depending upon the design requirements. The phase delay plate 72 delays one of the components $E_y$ or $E_z$ with respect to the other component. This results in the delivery to the member 26' of light flux with phase delayed components.

With force or pressure p exerted on the top surface 30' of the member 26', shear or bending stresses are induced in the member 26'. Such stresses comprise compressive stresses C in the upper layer 27 and tensile stresses T in the lower layer 29. The illustrated compressive stresses C and tensile stresses T, extend in a direction along the z-axis and are transverse to the direction of the path 66' of the light flux through the member 26'. The photoelastic effect of such transverse stresses in the member 26' upon the transmitted light flux is to delay one of the components Ey with respect to the other component Ez. The photoelastic effect of stress birefringence is well known and treated in detail in "Photoelasticity" by Max Mark Frocht, Volume II, Chapter 10, pages 333-337, John Wiley & Sons, Inc. 1948, and in "Principles of Optics," by Max Born and Emil Wolf, Fifth Edition, pages 703-705, Pergamon Press, 1975. The delay produced by the member 26' under stress is a function of the bending stresses, and therefore, the force or pressure p applied to the member 26' causing the bending stresses. Since the delaying effect is cumulative along the path 66', the extended length of the path 66' through the member 26', in effect, magnifies and increases the sensitivity of the photoelastic sensing means 10'. After traversing the path 66', the flux passes through the analyzer 65' before being received by the detector 60'. The analyzer 65' passes the components of the light flux which have a predetermined direction while preventing transmission of light flux in the transverse direction. The vector $E_o$ shows the direction of the polarized light flux which is passed to the detecting diode 60'. As illustrated in FIG. 4, the vector $E_o$ is in the y'z'-plane normal to the x-axis and is displaced 45° from the negative z'-axis. The vector $E_o$ is also displaced clockwise 90° from the vector $E_i$ of the light flux passed by the polarizer 63'. The 90° displacement of the input and output vectors $E_i$ and $E_o$ provided by the described arrangement of the polarizer 63' and analyzer 65' is commonly referred to as a "crossed" arrangement of light filters. However, the output vector $E_o$ may be provided parallel to the input vector $E_i$ or in any other desirable arrangement, depending upon the design requirements and the output signals sought to be derived from the sensing means 10' for its particular operating conditions.

With the polarizer 63' and analyzer 65' arranged as shown in the crossed relationship, and in the absence of the phase delay plate 72 and prestressing of the photoelastic member 26', the polarized light represented by the vector $E_i$ is propagated in the x-axis direction along the path 66' through the member 26' without producing a phase delay of either one of its components $E_y$, and $E_z$ with respect to the other. The light flux $E_i$ is therefore received by the analyzer 65' as shown by vector $E_i'$ in the same direction as the original vector $E_i$, and displaced 90° from the output vector $E_o$. With this crossed arrangement, none of the transmitted light flux is passed by the analyzer 65' to the detector diode 60'. However, with the application of force or pressure P to the member 26', a delay of one of the components $E_y$, $E_z$ with respect to the other component, changes the polarized light transmitted so that it provides a component in the $E_o$ direction of the analyzer 65', which component is transmitted to the detector 60'. As the applied force or pressure to the member 26' is increased, the amplitude of the component of the transmitted flux in the $E_o$ direction also increases, resulting in a corresponding or increased output signal by the detector 60'. The amplitude of the component in the $E_o$ direction increases to the point where the vector of the transmitted flux is displaced from $E_i$ to coincide in direction with the vector $E_o$, so that all of the light flux transmitted to the analyzer 65' is in the direction Eo and is passed to the detector 60'.

The phase delay plate 72 may be used to provide operation of the sensing means 10' along a linear portion of the characteristic output curve to provide linearly related output signals, if desired. Shifting of the operating curve to produce this effect may also be obtained by prestressing the member 26', as by use of the spring 73 illustrated in connection with the photoelastic sensing device 10 of FIG. 1. Of course, both a phase delay plate and prestressing means may be utilized in combination when desirable.

In the special case where the photoelastic member 26, 26' of means 10 and 10' is very thin, and in which the light flux is provided by a single source for transmission through both the compressive and tensile layers of the member to the detecting means, the use of the delay phase plate 72 may not be desirable where maximum sensitivity is required. Under such circumstances, as will be shown in greater detail hereinafter, the sensitivity of the sensing means may be reduced. The use of such delay means, however, may be desirable for obtaining a controlled reduction of sensitivity.

FIGS. 5 and 6 illustrate a photoelastic sensing means 80 particularly adapted for measuring displacement or distance. The sensing means 80 comprises a housing 82 having a top cylindrical portion 84 and a bottom portion 86 providing a cavity therewithin. The top and bottom portions 84 and 86, are provided with radially extending flanges 89, 91, which receive between them a thin circular sealing gasket 88, and are secured together by bolts 90. The housing 82 receives within its cavity, a cylindrical support unit 92 which is retained within the bottom portion 86 by engagement with the inwardly extending flange 94 of the top portion 84 of the housing 82. The support unit 92 includes a pair of horizontal inwardly extending arms 96, 98, having ends with slots or grooves 99 for slidably receiving therein and retaining the ends of a substantially rectangularly shaped photoelastic member 100.

The top portion 84 of the housing 82 is provided with an opening 102 which has therein a bushing 104 with a vertically extending opening. A rod element 106 is slidably received through the opening of the bushing 104 for being movable in the vertical direction. The bottom portion of the rod element 106 is provided with a lock ring 108 thereabout, for engaging the bottom of the bushing 104 and limiting the upward movement of the rod element 106 out of the housing 82, while leaving a lower end portion of the rod element 106 extending into the cavity 110 within the top of the housing 82. The top end of the rod element 106 is designed for attachment to external means for exerting a downward force thereon or providing a vertical displacement thereof.

A coil spring 112 positioned within the cavity 110 of the housing 82, has a cup portion at its top for receiving therein the lower end portion of the rod element 106. The spring 112 extends downwardly toward the center of the top surface of the photoelastic member 100 and has at its bottom a horizontally extending linear portion 114 which engages the member 100. The linear portion 114 contacts the member 100 along a line intermediate and parallel to the end edges 116, 118 of the retained ends of the member 100. Since the ends of the member 100 are retained by the arms 96, 98, the force applied by the spring 112 intermediate the ends produces bending stresses in the member 100. The side edge surfaces 120, 122 of the member 100 are parallel to each other and extend between the end edges 116 and 118. A polarizer 126 and an analyzer 128 (FIG. 6) are secured by epoxy or other suitable transparent means directly to respective edge surfaces 120 and 122 of the member 100 at regions opposite to each other for the transmission of light flux therebetween along the path 124 through the member 100, parallel to the end edges 116 and 118. In addition to the polarizer 126, a phase delay plate (not shown) may also be positioned and secured between the polarizer 126 and the edge 120 of the member 100, as desired or required by design circumstances.

In the particular embodiment of the means 80 illustrated, light flux is delivered to the polarizer 126 over an optical fiber 130 from a source of light flux 132. The light flux may be derived from an external source 132 or even from another system for modification by the photoelastic sensing means 80. The optical fiber 130 provides a light channel which extends through a protective sleeve 134 into the lower cavity 136 of the housing 82. The source 132 simultaneously also provides light flux to a second channel over an optical fiber 138 extending through the sleeve 134 for delivery to an optical fiber delay coil 140 wound within the cavity 110 of the upper portion 84 of the housing 82. After passage through the coiled optical fiber 140, the light flux is conducted by the optical fiber 138' out of the housing 82 through a protective sleeve 142 to a signal detecting and comparing means 144 for use in providing an output signal. The light flux which is received by the polarizer 126 over the fiber 130, and first transmitted by the member 100 and then passed by the analyzer 128, is received by optical fiber 146 which also extends through the sleeve 142. The fiber 146 delivers flux to the detecting and comparing means 144 for use in providing the output signal of the photoelastic sensing means 80.

In operation, when the rod 106 is not displaced downwardly, the coil spring 112 provides a minimal downward force to the top surface 101 of the member 100.

This minimal force prestresses the member 100 to the extent desired for providing the no load output signal by the detecting and comparing means 144. The prestressing force may also be selected to provide operation of the sensing means 80 along the linear characteristic portion of the signal output curve or at any other desired portion. As the rod element 106 is displaced in the downward direction, it compresses the coil spring 112 and increases the force which the spring end 114 exerts upon the member 100. The bending stresses produced in the member 100 affect the relative delay of the components of the transmitted polarized light along its polarized optical path 124, and the corresponding output flux passed by the analyzer 128 to the means 144 over the optic fiber 146. The light source 132, in the embodiment illustrated simultaneously delivers very short pulses of light over both of the fibers 130 and 138. This results in delivery of a pulse of light flux over line 146 to the detecting and analyzing means 144 which is followed by an unmodulated pulse of light flux from the source 132 which has been delayed by transmission through the coil 140. The device 144, thus, receives sequential pulses of light flux, first one which has an intensity affected by the displacement of the rod 106, which is then followed for comparison purposes by one which is representative of the original light flux provided by the source 132 to the polarizer 126. By comparing the quantities of flux derived from the first and second channels, the photoelastic sensing means 80 compensates for variations in the level of light delivered by the source 132 for providing its output signal indicating the displacement of the rod 106.

FIG. 7 illustrates a photoelastic sensing means 150 which is a modified form of the means 80 of FIG. 5 suitable for measuring force applied to its rod element 106'. Because of the similarities of the photoelastic sensing means 80 and 150, only the differences are described in detail.

The end 152 of the rod 106' which extends downwardly in the chamber 110, is tapered to a rounded tip 153 which contacts the upper surface 101 of the member 100 between its end portions which are supported by the arms 96, 98 for inducing bending stresses therein. A coiled spring 154 received about the tapered end 152 of the rod element 106', has its upper end anchored to the top section 84 of the housing 82 proximate to the bushing 104, while its lower end 156 is secured with the rod 106' close to its tip 153. The spring 154 causes the rod 106' to exert a minimum prestressing force upon the member 100 in the absence of an external force applied to the rod end 158 which extends out of the housing 82.

In operation, the exertion of downward force on the end 158 of the rod 106' results in the application of the force by its end 153 to the member 100. The resulting bending stresses in the photoelastic member 100 cause the sensing means 150 to produce an output signal which is responsive to the applied force.

Figure 8:
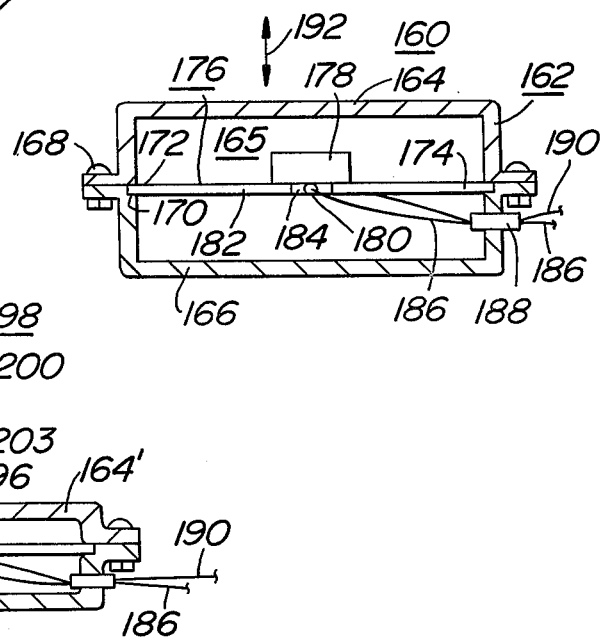
FIG. 8 is a sectional view of a photoelastic sensing device embodying the invention for measuring acceleration or inertial forces.

FIG. 8 illustrates a photoelastic sensing means 160 for measuring acceleration or inertial force. The photoelastic sensing means 160 has a housing 162 comprising top and bottom portions 164, 166, secured together at their flanges by bolt means 168 and providing a cavity 165 therewithin. The bottom portion 166 provides a shoulder or groove 170 proximate its flange region for retaining between the top and bottom portions 164 and 166, the opposite end portions 172, 174 of a rectangular photoelastic member 176. The member 176 has an intermediate portion for being freely flexed between its end portions 172 and 174. A body or mass 178 is secured to the member 176 at a region intermediate its end portions 172, 174. A light source 180 provides light flux to the peripheral edge region 182 between the end portions 172 and 174 through a polarizer 184. The light travels through the member 176 to the opposite edge region, where it passes through an analyzer to a detector diode (not shown). Electrical conductors 186 extend through a protective sleeve 188 for energizing the light source 180, while an output signal from the detector diode is delivered over electrical conductors 190 which pass through the sleeve 188 for providing the output signal. When the photoelastic sensing means 160 is accelerated in the up and down direction indicated by the arrows 192, the body 178 because of its inertial properties, exerts a force on the member 176, causing bending stresses. As already noted, such stresses result in an output signal related to the force applied to the member 176, which signal is delivered by the conductors 190. If subjected to an oscillatory motion, the sensing means 160 can also be designed to have a sensitivity and a dynamic response for providing an output signal indicating the variations and frequency of such motion.

Figure 9:
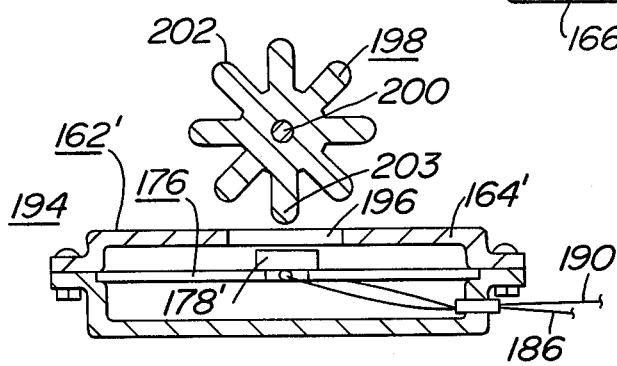
FIG. 9 is a sectional view of another form of the photoelastic sensing device for measuring the proximity, relative position and motion of one body with respect to another body.

FIG. 9 is a sectional view illustrating a photoelastic sensing means 194 for measuring the proximity or the relative positions or motions of bodies. The sensing means 194 is provided with a housing 162' which may be similar to that of the sensing means 160 of FIG. 8, except that the top portion 164' of the housing 162' is provided with a window 196 or a region which is permeable to magnetic forces. To avoid the extraneous effects of stray light, the photoelastic member 176 may have its outside surface covered by a light proof coating, such as black paint. The body 178' is of a magnetic material for providing a magnet or magnetic field and is secured with the member 176 opposite the window 196. A rotary element 198 of magnetically conductive material is positioned proximate to the window 196 for rotation about an axis 200. The element 198 is provided with a plurality of radially extending portions or fingers 202.

In operation, the element 198 rotates about its axis 200 so that each of its fingers 202 sequentially approaches and then moves away from the body 178'. As a finger 203 approaches the body 178', the magnetic force between the element 198 and the body 178' increases, and then decreases as the finger moves away, resulting in a varying force being applied to the member 176. The sensing means 194, thus, is responsive to the proximity of the respective fingers 202 to the magnet 178', and also provides an output signal which has a frequency which is related to the rotation of the element 198. The sensing means 194, thus, in addition to measuring proximity may also be utilized for determining the angular position and rate of rotation of an external body without being mechanically coupled thereto.

Figure 10:
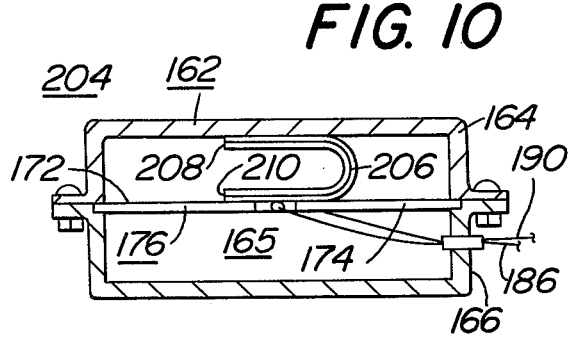
FIG. 10 is a sectional view of another form of the photoelastic sensing means for measuring temperature, FIG. 11 diagrammatically illustrates the parameters for specifying the arrangement and positioning with respect to a photoelastic member of the means providing light flux thereto and the means for receiving light flux transmitted by the member, FIGS. 12A, 12B, 12C, and 12D, each diagrammatically illustrates a particular distinct arrangement and positioning with respect to a photoelastic member of the means providing light flux thereto and the means for receiving light flux therefrom in which the entire edge surface or only a portion of the edge surface of the member at various locations are irradiated for providing different output characteristics for the photoelastic sensing means, FIG. 13 graphically illustrates the output signals derived by calculation for the respective arrangements of the photoelastic sensing means shown in FIGS. 12A, 12B, 12C, and 12D, FIG. 14 graphically illustrates the output signals derived by calculation for the arrangement of the photoelastic sensing means shown in FIG. 12A without a phase delay plate, with an ⅛ wavelength phase delay plate, and with a ¼ wavelength phase delay plate in the polarization optical path, FIG. 15 graphically illustrates the output signals derived by calculation for the arrangement of the photoelastic sensing means shown in FIG. 12B without a phase delay plate, with an ⅛ wavelength phase delay plate, and with a ¼ wavelength phase delay plate in the polarization optical path, FIG. 16 graphically illustrates the output signals derived by calculation for the arrangement of the photoelastic sensing means shown in FIG. 12C without a phase delay plate, with an ⅛ wavelength phase delay plate, and with a ¼ wavelength phase delay plate in the polarization optical path, FIG. 17 graphically illustrates the output signal produced by an embodiment of a photoelastic sensing means of the invention provided for measuring vacuum pressure, FIG. 18 graphically illustrates the output signal produced by an embodiment of a photoelastic sensing means of the invention provided for measuring gauge pressure, FIG. 19 graphically illustrates the output signals produced by an embodiment of a photoelastic sensing means of the invention provided for measuring small negative and positive gauge pressures, and FIG. 20 graphically illustrates the output signal produced by an embodiment of a photoelastic sensing means of the invention provided for measuring force.

FIG. 10 illustrates a photoelastic sensing means 204 which provides an output signal responsive to temperature. The sensing means 204 may have a housing 162 such as that of the sensing means 160 of FIG. 8, with the upper and lower portions 164 and 166 having engaged therebetween the end portions 172 and 174 of the member 176. The sensing means 204 differs from the sensing means 160, by providing a U-shaped bimetallic element 206 in place of the body or mass 178.

The bimetallic element 206 has a first leg 208 engaging the inside surface of the top portion 164 of the housing 162 within its cavity 165, and a second leg 210 engaging the top surface of the member 176 in the region intermediate its end portions 172, 174. The housing may be made of metal or other heat conducting material or the top portion 164 of the housing 162 may be provided with a portion which provides good heat transmission to the bimetallic element 206. Since the bimetallic element 206 tends to alter its configuration for different temperatures, a force is exerted between the upper portion 164 of the housing 162 and the member 176 depending upon its temperature. The bimetallic element 206, thereby, provides a force which varies with the temperature which it attains. The force induces bending stresses in the member 176, and results in an output signal which is a measure of the temperature being sensed.

As noted particularly in connection with the sensing means 80 of FIG. 5, the embodiments of the sensing means 160, 194 and 204 may also have light provided to each of their photoelastic members from an external source over an optical fiber and may also deliver output light flux by optical fiber means to an external means for detection and further processing.

For the purpose of considering in greater detail, the manner in which polarized light is propagated through a thin photoelastic member, as for example that of the sensing means 10 of FIG. 1, and the effect of its propagation through both layers or only one of the stressed layers of the member 26, as well as the additional effects on the output results when phase delay plates are used, the following mathematical analysis is provided.

For simplifying the analysis, the size and shape of the region of the photoelastic member receiving light flux from the source are taken to be identical to the size and shape of the region at which light flux is delivered by the member for being detected. Refer to FIG. 11, which schematically illustrates a photoelastic member 210 with vertical opposite edge surfaces 212 and 214. The source 216 of polarized light flux is shown positioned at the edge surface 212, while the detector 218 is shown on the opposite edge surface 214 for receiving flux traveling therebetween along the path 220. The light flux is considered to be collimated and to pass directly from the light source 216 to the detector 218 without internal reflections. The light source 216 and detector 218 are associated with respective rectangular areas on the edge surfaces 212 and 214 which receive and deliver light, and the intensity of the light flux provided and the sensitivity of the detector are constant over the respective rectangular areas. The polarizer of the source 216 and the analyzer of the detector 218 are perfect, that is, the polarizer absorbs exactly 50% of the non-polarized light which it receives, and the polarizer and analyzer each absorb only the component of the light which is polarized in a direction perpendicular to its optical axis. In the case where a phase delay plate is utilized, there is no absorption or dissipation of light flux in the phase plate.

Under the above conditions, the quantity of nonpolarized light flux input $F_{in}$ in provided by the source is the product of the intensity of the source 216 and the irradiated area over which light flux is delivered, so that:

$$F_{in} = I_o w(Z_2 - Z_1)$$

or $$F_{in} = w\Delta Z I_o, \quad (1)$$

where $I_o$ is the input intensity, w is the width of the irradiated area, and the parameters $Z_1$ and $Z_2$ are measured vertically from the neutral plane 222 of the member 210 in FIG. 11 to the bottom and top of the light source 216. The difference $Z_2 - Z_1$ expressed as $\Delta Z$ provides the distance between the top and bottom of the light source 216 and the vertical height of the irradiated area along the edge surface 212 of the member 210.

The output flux F delivered through the analyzer to the detector 218 is expressed as a function of pressure applied to the top surface of the member 210 when mounted as in the means 10 of FIG. 1, and is given as:

$$F = \frac{wI_o\Delta Z}{4}\left(1 - \frac{\sin Cp\Delta Z}{Cp\Delta Z}\cos[Cp(Z_1 + Z_2) + \Delta_1]\right) \quad (2)$$

where $C = 3 \times 10^{-13}\frac{n\pi Ba}{\lambda h^3}(1-v)(a^2/3 + h^2)$, and p = applied pressure,
n = index of refraction,
B = Brewster's constant,
a = radius of photoelastic member,
λ = light flux wavelength,
h = thickness of photoelastic member,
v = Poisson's ratio, and
$\Delta_1$ = arbitrary constant phase difference.

To determine the sensitivity of the output signal of the photoelastic sensing means, the rate of change of flux with respect to pressure is derived, giving the following:

$$S = \frac{\partial F}{\partial p} \quad (3)$$

$$S = \frac{wI_o\Delta Z}{4}\left\{C(Z_1 + Z_2)\frac{\sin u}{u}\sin(Cp(Z_1 + Z_2) + \Delta_1) - \frac{1}{p}\cos(Cp(Z_1 + Z_2) + \Delta_1)\left[\cos u - \frac{\sin u}{u}\right]\right\}$$

where $u = Cp\Delta Z$.

Four special cases for the function F of equation (2) are now considered. The arrangements of components for the four cases A, B, C and D are illustrated respectively by the FIGS. 12A, 12B, 12C and 12D.

CASE A

For the first case A, FIG. 12A shows the photoelastic member 210A with a source of light 216A extending completely between the top and bottom surfaces of the member, and with the detector 218A having a similar arrangement on the opposite side of the member. This may be mathematically expressed by reference to the FIG. 11, as the condition where $Z_1 = -Z_2 = h/2$. With $Z_1 = -Z_2$ and the arbitrary phase delay $\Delta_1$ equal to 0, the equation (2) above reduces to the following:

$$F = \frac{wI_o\Delta Z}{4}\left(1 - \frac{\sin Cp\Delta Z}{Cp\Delta Z}\right) \quad (4)$$

Again the sensitivity of the equation (4) for this case is obtained by the derivative of F with respect the pressure p, given by $$S = \frac{-wI_o\Delta Z}{4p}\left(\cos Cp\Delta Z - \frac{\sin Cp\Delta Z}{Cp\Delta Z}\right) \quad (5)$$

CASE B

In the case B, illustrated by FIG. 12B, the source of light 216B irradiates a region on the end surface 212 of the member 210B extending from the neutral plane 222 to the top surface of the member. The detector 218B, is similarly arranged for receiving light flux at the region of the opposite end surface 214 extending from the neutral plane 222 to the top surface of the member 210B. This condition where the light source 216B and detector 218B are bounded on one side by the neutral plane is mathematically expressed by letting $Z_1=0$ as seen from FIG. 11. The expression of equation (2), with such a substitution and with phase shift $\Delta_1$ equal to 0, provides $$F = \frac{wI_oZ_2}{4}\left(1 - \frac{\sin 2CpZ_2}{2CpZ_2}\right) \quad (6)$$

For case B, the derivative of equation (6) with respect to pressure p shows the sensitivity to be $$S = \frac{-wI_oZ_2}{4p}\left(\cos 2CpZ_2 - \frac{\sin 2CpZ_2}{2CpZ_2}\right) \quad (7)$$

CASE C

For case C, as shown in FIG. 12C, the member 210C is provided with its light source 216C entirely on one side of the neutral plane 222 but not bounded by the neutral plane. The source 216C is also small with respect to the height h of the edge surfaces 212, 214 of the member as seen in FIG. 11. The size and position of the light source 216C and light detector 218C along the edge surfaces 212, 214 of the member 210C may be mathematically expressed by the condition where the dimension $Z_1$ approaches in size the dimension $Z_2$ so that $Z_1$ is approximately equal to $Z_2$, and their difference $\Delta Z$ approaches 0. For case C, the sum $Z_1$ and $Z_2$ can also be taken approximately equal to $2Z_1$ or $2Z_2$, so that with a phase delay or shift $\Delta_1$ of 0, the expression for output flux is $$F \simeq \frac{wI_o\Delta Z}{4}(1 - \cos 2CpZ_2) \quad (8)$$

The sensitivity for case C, provided by taking the derivative of F of equation (8) with respect to pressure gives $$S = \frac{wI_o\Delta Z}{2} CZ_2 \sin 2CpZ_2 \quad (9)$$

CASE D

Referring to FIG. 12D for case D, the light source 216D is small with respect to the height h of the end surfaces 212, 214 of the member 210D, and is centered about the neutral surface 222 on the end surface 212. The detector 218D is also small and similarly positioned on the opposite end surface 214 of the member 210D. In this case, $Z_1$ is equal to $-Z_2$, and their difference $Z_2-Z_1$ expressed as $\Delta Z$, yields $2Z_2$. For these conditions and with the phase delay $\Delta_1$ equal to 0, equation (2) reduces to $$F = \frac{wI_oZ_2}{2}\left(1 - \frac{\sin 2CpZ_2}{2CpZ_2}\right) \quad (10)$$

The derivative of equation (10) with respect to pressure p provides the sensitivity for this case, expressed as follows $$S = \frac{wI_oZ_2}{2p}\left(\frac{\sin 2CpZ_2}{2CpZ_2} - \cos 2CpZ_2\right) \quad (11)$$

In considering the above mathematical equations for flux received by the detector and the sensitivity provided by the various arrangements with the photoelastic member of the light source and detector, the following important conclusions can be drawn.

1. If the components provide a light source with a fixed intensity and an arbitrary size which must be centered ($Z_1=-Z_2$), the greater the size the greater the sensitivity (Case A).

2. For components providing a light source with a fixed intensity but of arbitrary size, the greatest sensitivity S is obtained when the components extend over the entire edge surface of the member, from $Z_1=-h/2$ to $Z_2=+h/2$ (Case A).

3. If, for example, the components provide a light source with a fixed size of h/2, it is 4 times better to center the components about the neutral plane on a thinner member which is h/2 thick (Case A), than to position them off-center on a member having a thickness h which is twice as thick (Case B).

4. If the components are centered about the neutral plane (Cases A, D), the sensitivity is always zero for the pressure p=0. At non-zero pressures the sensitivity S is greatest in the absence of a phase delay plate or for phase delay plates providing a phase delay $\Delta_1=n\pi$ where n=0, 1, 2 ...

5. If the components are not centered about the neutral plane (Cases B, C), the sensitivity S for pressure p=0 depends on the phase delay $\Delta_1$. If the components are completely on one side of the neutral plane the maximum sensitivity is obtained with a quarter wave delay plate or a phase delay $$\Delta_1 = \frac{(2n+1)\pi}{2}, n = 0, 1, 2 \ldots$$

6. For components providing a small light source of fixed intensity and size ($\Delta Z$ small), the greatest sensitivity S is obtained with the components as far as possible from the neutral plane and ($Z_1+Z_2$) as large as possible (Case C).

In summary, the above analysis shows that for maximum sensitivity S, a photoelastic member of fixed thickness with components of fixed sizes, should have the light source and detector placed as near as possible to an upper or lower surface of the photoelastic member (Case C). On the other hand, if the thickness of the member is variable while the source of light and detector have fixed dimensions, the member should be made as thin as possible. If, conversely, the thickness of the member is fixed and the sizes of the light source and detector are variable, and assuming that the light source is of constant intensity, maximum sensitivity is obtained by providing components large enough so they completely extend over the edge surfaces of the member (Case A).

The FIG. 13 illustrates by respective curves the output flux F of equation (2) for the cases A, B, C and D considered above. The corresponding curves A, B, C and D are graphed for the ratio of $F/F_{in}$, according to the equation $$\frac{F}{F_{in}} = 0.25\left(1 - \frac{\sin C_p\Delta Z}{C_p\Delta Z} \cos [C_p(Z_1 + Z_2) + \Delta_1]\right) \quad (12)$$

For the purpose of graphing, the pressure p is in lbs/square inch and the constant C as defined in connection with equation (2) above, was determined by using the following values:

n=1.5
B=3.0 Brewsters
a=0.5" (1.27 cm)
$\lambda$=6.6×10$^{-5}$ cm (6600Å)
h=$\frac{1}{8}$" (0.3175 cm)
$\nu$=0.20 which provide C=1.30×10$^{-6}$ cm/dyne or 0.228 in./lb. Although other values can be used for determining the constant C, the values used above are typical of borosilicate glass. The curves were computer generated for the respective following conditions and values assigned to equation (12):

Case A: The light source and detector extend over the entire height h of the edge surfaces of the member, ie, $\Delta Z$=h and $Z_1$=$-Z_2$ giving $$F_A = 0.25\left(1 - \frac{\sin (0.0285p)}{0.0285p} \cos \Delta_1\right) \quad (13)$$

Case B: The light source and detector extend over only $\frac{1}{2}$ of the height h above the neutral plane of the member, so that $\Delta Z$=h/2, $Z_1$=0 and $Z_2$=h/2, providing $$F_B = 0.25\left[1 - \frac{\sin (0.0142p)}{0.0142p} \cos (0.0142p + \Delta_1)\right] \quad (14)$$

Case C: The light source and detector are small and border the upper surface of the photoelastic member, the height of each of the components being $\Delta Z$=0.008 inch, with $Z_2$=h/2, and $Z_1$=h/2−0.008. These values provide the following relationship $$F_C = 0.25\left[1 - \frac{\sin (0.00182p)}{0.00182p} \cos (0.0266p + \Delta_1)\right] \quad (15)$$

Case D: The light source and detector are small with respect to the height h of the member, and are centered about the neutral plane. Although this represents the worse case for sensitivity, the sensitivity is not zero because the components are of finite size. In this case, $\Delta Z$=0.008 inch, and $Z_1$=$-Z_2$=0.004 inch, providing the following expression $$F_D = 0.25\left(1 - \frac{\sin (0.00182p)}{0.00182p} \cdot \cos \Delta_1\right) \quad (16)$$

In FIG. 13, the curves A, B, C and D correspond to the above equations (13), (14), (15) and (16) for cases A, B, C and D. It is noted that the arbitrary phase delay $\Delta_1$ is taken as 0, which means that a phase delay plate was not utilized for the results obtained. The curves A and B for equations $F_A$ and $F_B$ coincide and have a portion 250 with a positive slope which is substantially linear between the values of 50 and 125 lbs./square inch. On the other hand, case C provides a curve C for equation $F_C$ with a rising portion 252 having a greater positive slope and reaching a maximum value of 0.5 compared to a maximum of approximately 0.3 for the curves A and B. In contrast, the curve D for equation $F_D$, which shows a very low sensitivity, rises only slightly with increase in pressure. This graph thus illustrates the high sensitivity obtained for the arrangement of case C, and the low sensitivity provided for Case D compared to that of the cases A and B.

FIG. 14 is a graph which illustrates the changes produced in the curve A of FIG. 13 when the light flux from the source is subjected to phase delays produced by phase delay plates of $\frac{1}{8}$ wave length ($\lambda$/8), and $\frac{1}{4}$ wavelength delay ($\lambda$/4). In each case, the introduction of a phase delay results in a curve with a rising portion having a slope which decreases as the delay increases. Thus, by using an appropriate phase delay, the sensitivity of the photoelastic sensing means may be controlled to provide a decreased value from the maximum obtained in the absence of a phase plate. Accordingly, curve A' which represents the flux ratio $F_A$ for the case A with a phase $\Delta_1$, provided by phase delay plate of $\frac{1}{8}$ wave length, has a rising portion 250A' of decreased slope signifying decreased sensitivity. When the phase delay is increased to provide a delay of $\frac{1}{4}$ wavelength, as illustrated by curve A", a constant output signal is provided representing the ultimate condition of zero sensitivity. It is apparent that if maximum sensitivity is desired for case A where a photoelastic member receives light flux over the entire region of its edge surface between its upper and lower outer surfaces, a phase delay plate should not be utilized. However, if it is desired to operate within the linear portion 250 of the curve A, the curve A may be shifted to the left by prestressing as illustrated in FIG. 1 by the utilization of the spring 73.

FIG. 15 also serves to illustrate the changes produced in the curve B of FIG. 13 when light flux is transmitted through only one of the stressed layers of the member 26' and is also subjected to a phase delay such as provided by the plate 72 of the photoelastic sensing means 10' of FIG. 3. The curve B' is for the use of a $\frac{1}{8}$ wavelength phase delay, while curve B" illustrates the effect when a $\frac{1}{4}$ wave delay plate is utilized. In each case, the curves B, B' and B" have substantially the same slope for their respective linear portions 250, 250B' and 250B", although the delays result in shifting the curve B' to the left of curve B and shifting the curve B" to the left of the curves B and B'. The curves B' and B" also show higher maximum values for increased delay. Thus, the use of delay plates in case B, does not significantly affect the sensitivity but does shift the operating region of the output curve. In this way, it is possible by use of phase delay plates to shift the linear portion of the curve as required for the design purposes. A similar result may also be achieved by prestressing, as illustrated by the use of the spring 73 in the photoelastic sensing means 10 of FIG. 1. Prestressing means and phase delay plates may be used concurrently for obtaining the desired results.

FIG. 16 illustrates the changes produced in the curve C of FIG. 13 by the use of phase delay plates for case C, in which a small light source is displaced from the neutral plane of the photoelastic sensing member. As the displacement of the source of light from the neutral plane increases, the compressive or tensile stresses through which the light flux extends also increase in magnitude, until the maximum magnitude is reached at the border with the upper and lower surfaces of the photoelastic sensing member. Because of the effect produced by such displacement, the curve C is characterized by a region 252 having a slope which is greater than the slopes of the curves A, B and D, and also a flux ratio $F_C$ which reaches a higher maximum value than those of the curves for the other cases. Use of a phase delay plate of $\frac{1}{8}$ wavelength results in a similar shaped curve C' displaced to the left of the curve C, while a phase delay plate providing a $\frac{1}{4}$ wavelength delay results in a like shaped curve C" which is displaced to the left of the curve C'. The use of phase delay plates in connection with the arrangement of case C (FIG. 12C), thus, does not significantly affect the sensitivity or the maximum amplitude of the output signals derived. The case C curves C, C' and C" each also provide extensive linear portions 252, 252' and 252", with that of curve C, for example, extending from about 25 lbs./square inch to about 100 lbs./square inch.

As noted above, the curves of the FIGS. 13, 14, 15 and 16 are derived by computer graphing of the the equations (13), (14), (15) and (16). They do not represent the results provided by actual test data derived from physical embodiments of the invention. The curves of graphs 17, 18, 19 and 20, however, do show the expected characteristics for output signals of photoelastic sensing means embodying the invention. Actual readings have been taken of physical embodiments of the invention for providing the curves shown and discussed in connection with the FIGS. 17, 18, 19 and 20.

Figure 17:
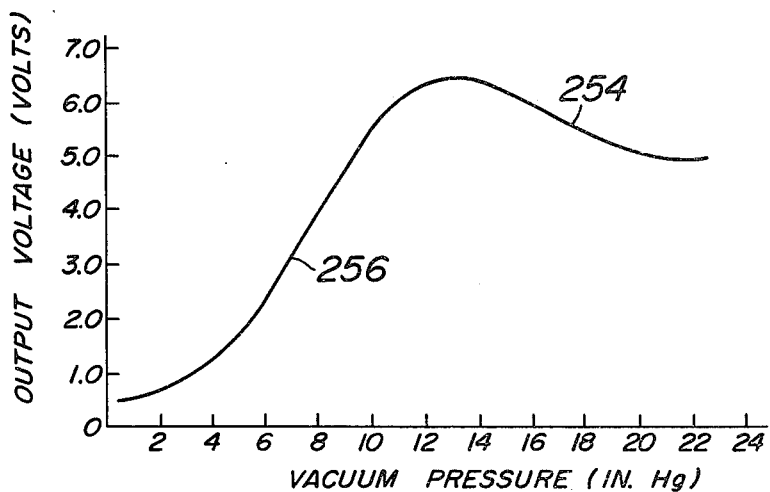

FIG. 17 by curve 254 graphically represents an output signal provided by a photoelastic sensing means similar to the means 10 illustrated in FIG. 1, for measuring vacuum pressure in inches of Hg. The sensing means utilizes a circular photoelastic member having a diameter of about 0.9 inch and a thickness of 0.009 inch. The polarizer and analyzer were arranged in crossed relationship so that their principal axes were rotated 90° with respect to each other, as illustrated in FIG. 4 by the polarizer 63' and analyzer 65'. A phase delay plate was not utilized and the source of light and the light detector were positioned with respect to the photoelastic member as described for case A, illustrated by FIG. 12A. The output signal was provided by circuitry well known in the art for converting the quantity of flux received by the detector into a voltage output signal to provide an increasing voltage output signal with an increase in the quantity of detected light flux. The curve 254 has a linear region 256 for the measurement of vacuum pressure which extended between 5 and 10 inches of Hg.

Figure 18:
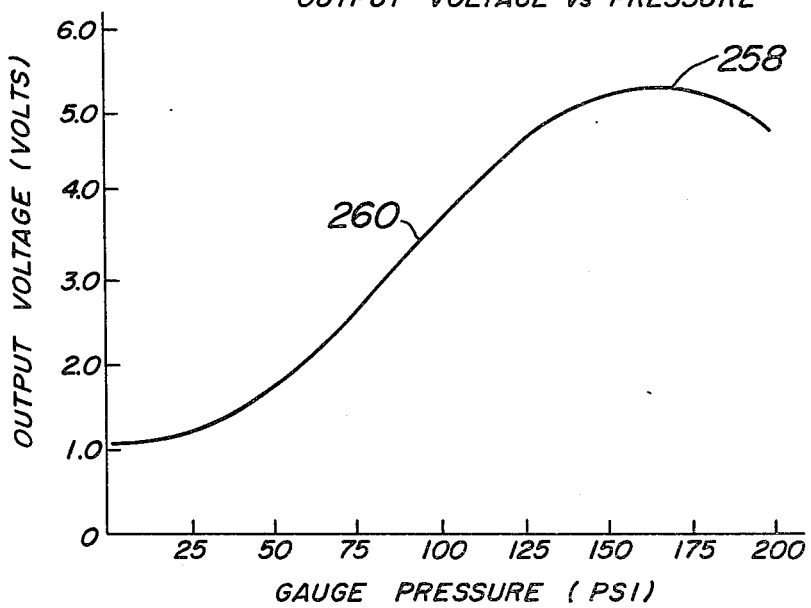

FIG. 18 is a graphic illustration similar to that of FIG. 17 in which the signal output curve 258 is for a photoelastic sensing means providing a voltage output signal for measuring gauge pressure in lbs./square inch. In this case, the sensing means had a circular photoelastic member with an increased thickness of 0.50 inch and a diameter of about 1 inch. A set of 90° crossed polarizer and analyzer plates were utilized in the absence of a phase delay plate as for the sensing means described in connection with FIG. 17. An arrangement similar to case B was utilized, in which the light path extended through the tensile layer only of the photoelastic sensing means similar to that for the photoelastic sensing means 10' of FIG. 3. The increased thickness of the photoelastic member allowed higher readings of pressure extending to over 150 lbs./square inch and readings over a linear region 260 of approximately between 50 and 125 lbs./square inch.

Figure 19:
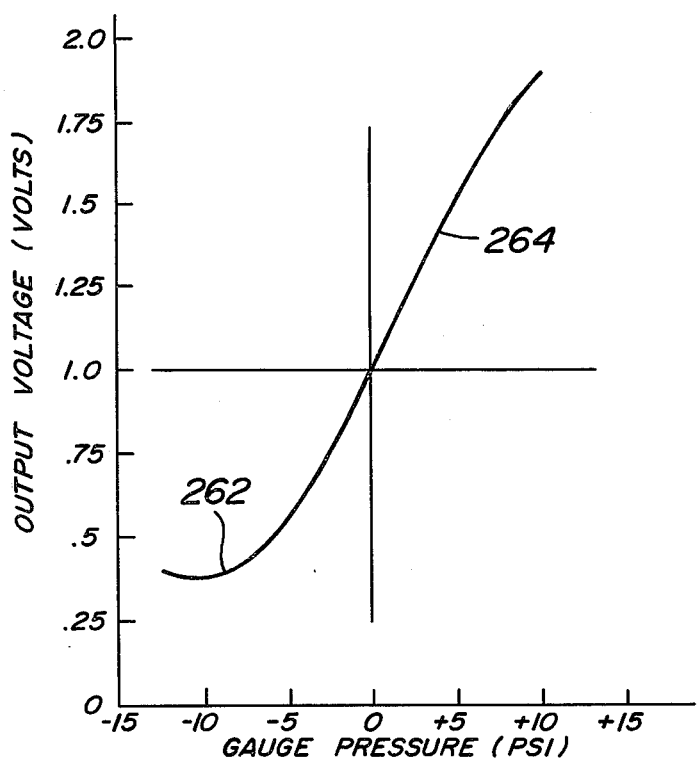

FIG. 19 is a graphic representation of an output signal provided by curve 262 for a pressure gauge providing readings below and above atmospheric pressure which is denoted by 1.0 volt reading. In this case, the sensing means had a circular photoelastic member with a thickness of 0.125 inch and a diameter of about 1.3 inches. The light flux path extended through one of the stressed layers only, and 90° crossed polarizer and analyzer plates were utilized. The arrangement was similar to that of the case C (FIG. 12C) with a phase delay plate of $\frac{1}{4}$ wavelength. The curve 262 has a substantially linear region 264 providing output signal voltages between 0.5 and 1.7 volts for pressure ranging between $-5$ to $+8$ lbs./square inch. The curve 262, thus, illustrates an output signal of high sensitivity over a small range of positive and negative values of gauge pressure.

Figure 20:
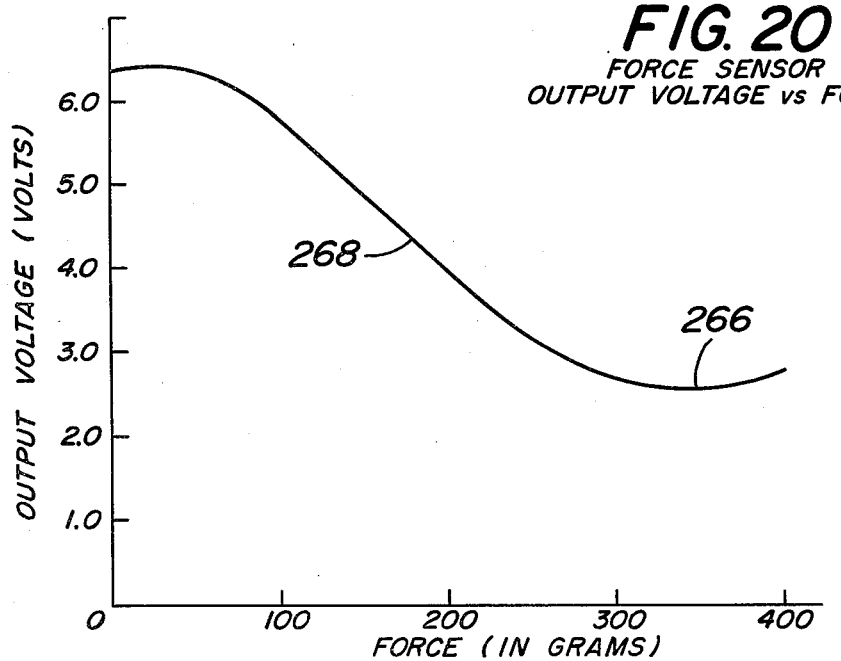

FIG. 20 by curve 266 graphically represents the output signal produced in response to force applied to a photoelastic sensing means of the type illustrated in connection with the sensing means 150 of FIG. 7. The photoelastic member utilized had a thickness of 0.040 inch, and a rectangular configuration with a width of 1.0 inch and a length of about 3.0 inches. The ends of the member were retained without being clamped, allowing slight movement of the ends with the exertion of the applied force. The light flux extended through the compressive layer only and a pair of filters was positioned as illustrated by the polarizer 63' and analyzer 65' of the sensing means 10' of FIG. 4, except that the analyzer had its principal axis aligned with or parallel to the principal axis of the polarizer and a phase delay plate was not utilized. The curve 266 illustrates the output signal in the form of the voltage derived for the applied force in grams between 0 and 400 grams. The curve 266 provides a maximum output voltage of over 6 volts for the application of a force of 0 grams, which voltage decreases with increasing force. This curve is inversely related to the force applied to the sensing means. If desired, the voltage derived from the output circuitry can be inverted to provide an increasing function for correspondance with the applied force. Curve 266 also provides a linear region 268 extending between approximately 100 to 250 grams force. A sensing means of the form illustrated by means 80 of FIG. 5 can also be used to provide an output curve similar to that of the curve 266 for indicating displacement of the rod 106 to provide corresponding output readings.

From the mathematical analysis provided in connection with the FIGS. 13 to 16, it is apparent that various configurations and arrangement of the components are possible and may be used for obtaining the optimum or desired sensitivity and range for particular applications and design circumstances, and for obtaining all or many of the advantages of the invention.

From the several embodiments of the invention disclosed herein, and the description and analysis provided in connection therewith, it will also be obvious to those skilled in the art, that many other modifications and variations thereof may be made for accomplishing the foregoing objects of the invention and realizing many or all of the advantages, without departing essentially from the spirit of the invention.

What is claimed is:

1. A photoelastic sensing means comprising a thin photoelastic member of transparent material having closely spaced top and bottom outer surfaces with peripheral edges and an edge surface extending between the peripheral edges of the outer surfaces, first means for providing light flux to the edge surface of the member for being transmitted by the member as polarized light flux along a path therethrough, the spacing between the top and bottom outer surfaces of the member being relatively small compared to the length of the path of the polarized light flux in the member, second means for receiving and detecting light flux transmitted by the member and providing an output signal, and third means supporting the member to produce therein bending stress in a direction transverse to the path of the light flux in the member with application of force to the member, the output signal of the second means being responsive to the force producing the stress in the member.

2. The sensing means of claim 1 in which the first means provides light flux at a first region of the edge surface for transmission along the path of the member to a second region of the edge surface, and includes polarizing means for polarizing the light flux of the first means to have rectangular vector components which are respectively parallel and perpendicular to the direction of the stress produced in the member, and the second means receives transmitted light flux from the second region of the edge surface of the member and detects changes in the respective rectangular components of the light flux received for providing the output signal.

3. The sensing means of claim 2 which includes housing means having a cavity therewithin and embodying the third means, and the member is supported within the cavity of the housing means by the third means.

4. The sensing means of claim 3 in which the member partitions the cavity within the housing means into first and second chambers.

5. The sensing means of claims 1, 3 or 4 in which the third means supports the member by engaging it proximate to a peripheral edge.

6. The sensing means of claims 1, 3 or 4 in which the member has a circular peripheral edge and the third means supports the member by engaging it proximate to its peripheral edge.

7. The sensing means of claim 4 in which the housing means includes an opening communicating externally with the first chamber, and the first and second chambers are sealed with respect to each other.

8. The sensing means of claim 7 in which the housing means includes means for providing fluid through its opening to the first chamber for applying force to an outer surface of the member, whereby the second means provides an output signal responsive to the applied fluid force.

9. The sensing means of claim 8 in which the housing means includes a second opening communicating externally with the second chamber.

10. The sensing means of claim 9 in which the housing means includes means for providing fluid through its second opening to the second chamber for applying force to the other outer surface of the member, whereby the second means provides an output signal responsive to the difference in forces applied to the top and bottom outer surfaces of the member.

11. The sensing means of claim 1 or 3 which includes biasing means for applying a force normal to an outer surface of the member.

12. The sensing means of claim 3 or 4 which includes biasing means for applying a force normal to an outer surface of the member at a location spaced from its peripheral edge.

13. The sensing means of claim 4, 7, 8 or 10 which includes spring biasing means received within the first chamber of the housing means for applying force normal to an outer surface of the member at a location spaced from its peripheral edge.

14. The sensing means of claim 3 in which the housing means includes an opening communicating externally with the first chamber, and which includes a rod element movable through the opening and extending into the cavity of the housing for applying force to an outer surface of the member to provide an output signal by the second means related to the applied force.

15. The sensing means of claim 14 in which the rod element has a first end for applying force to the outer surface of the member and a second end extending externally of the housing for receiving force to be applied to the member.

16. The sensing means of claim 15 which includes spring biasing means received within the cavity of the housing for applying force normal to the outer surface of the member, and the third means supports the member by engaging it proximate to a peripheral edge.

17. The sensing means of claim 16 in which the member has outer surfaces with rectangular peripheral edges providing the member with two pairs of opposite sides, the third means supports the member by engaging it at a first pair of opposite sides proximate its peripheral edges, the first and second means are positioned opposite each other along respective peripheral edges of the second pair of opposite sides for respectively providing light flux and receiving and detecting the light flux transmitted along the path therebetween, the first end of the rod is provided with a foot extending parallel to and contacting the surface of the member intermediate the first pair of sides, and the spring means is a coil extending about the rod and engaging the housing at one end for exerting force upon the outer surface of the member with its other end.

18. The sensing means of claim 14 which includes a spring element positioned within the cavity of the housing having a first end for engaging and applying force to an outer surface of the member and a second end, and in which the rod element has a first end engaging the second end of the spring element and a second end extending externally of the housing for being axially positioned with respect to the housing for deforming the spring element and varying the force applied to the member, whereby the output signal of the sensing means is responsive to the positioning of the second end of the rod element.

19. The sensing means of claim 18 in which the spring means is a coil which is axially aligned with the rod element and urges the second end of the rod element in the direction away from the housing, and which includes stop means for limiting the extension of the rod element out of the housing.

20. The sensing means of claim 3 which includes a body of given mass movably positioned within the cavity of the housing in engagement with the member for applying force to an outer surface thereof when the body is subjected to inertial forces, whereby the output signal of the sensing means is related to the inertial forces to which the body is subjected.

21. The sensing means of claim 3 which includes first and second bodies having magnetic properties, the first body is positioned within the cavity of the housing means for applying force to an outer surface of the member, and the second body is located external to the housing means and positioned with respect to the first body for applying force to the first body by utilizing the magnetic properties of the bodies, and in which the housing means provides for the exertion of force upon the first body by the magnetic effects of the second body.

22. The sensing means of claim 21 in which the first body is a permanent magnet and the second body is of a magnetic material which is movable with respect to the first body for varying the force therebetween and the force applied to the member.

23. The sensing means of claim 22 in which the second body is of metal and rotatable about a fixed axis having an irregular periphery for providing changes in the force applied to the member and correspondingly varying the output signal with its rotation.

24. The sensing means of claim 3 which includes a temperature responsive means positioned within the cavity of the housing means for applying force to an outer surface of the member, the temperature responsive unit tending to change in size with change of sensed temperature for providing the force to the member.

25. The sensing means of claim 24 in which the temperature responsive means comprises at least one metal element having a high temperature coefficient of expansion.

26. The sensing means of claim 24 in which the temperature responsive means is a bimetallic unit of metals having different coefficients of expansion and has a substantially U-shaped configuration with first and second legs, the first leg is fixed with respect to the housing means while the second leg exerts force related to the temperature sensed by the unit upon the outer surface of the member.

27. The sensing means of claim 1 in which the member has associated therewith a given mass for applying bending stress to the member when the sensing means is subjected to inertial forces, whereby the output signal of the sensing means is related to the inertial forces to which the sensing means is subjected.

28. The sensing means of claim 1 which includes a body positioned for applying force to an outer surface of the member, the body being sensitive to magnetic force for applying the force to the member.

29. The sensing means of claim 1 in which the bending stress produced with the application of force to the member provides a neutral stress surface intermediate the outer surfaces which partitions the member into first and second layers respectively above and below the neutral surface with one of the layers being in tensile stress while the other is in compressive stress, and the path for providing light flux to the second means extends through at least one of the first and second layers of the member.

30. The sensing means of claim 29 in which the first means comprises a single source for providing light flux at a first region of the edge surface for transmission by the member along paths through the first and second layers of the member to a second region of the edge surface, includes polarizing means for linearly polarizing the light flux of the source in a given direction to have rectangular vector components respectively parallel and perpendicular to the direction of the stress produced in the member, and the second means receives transmitted light flux from the second region of the edge surface of the member and detects changes in the respective rectangular components of the light flux received for providing the output signal.

31. The sensing means of claim 30 in which the second means includes light analyzing means for receiving light flux from the paths through the first and second layers and passing vector components of light flux which are in a predetermined direction.

32. The sensing means of claim 31 in which the analyzing means of the second means passes vector components of the light flux which are in a direction transverse to the given direction of the light flux of the polarizing means.

33. The sensing means of claim 32 in which the source of light flux of the first means is a light emitting diode, and the second means includes a photocell detecting unit responsive to the light flux passed by the analyzing means for providing the output signal of the sensing means.

34. The sensing means of claim 1 in which the bending stress produced with the application of force to the member provides a neutral stress surface intermediate the outer surfaces which partitions the member into first and second layers respectively above and below the neutral surface with one of the layers being in tensile stress while the other is in compressive stress, the first means provides light flux to the first region of the edge surface of the member at the location of a selected one of the layers, and the second means receives light flux transmitted along a path extending through the selected layer of the member to the second region of the edge surface at the location of the selected one of the layers of the member.

35. The sensing means of claim 34 in which the first means comprises a single source for providing light flux to a first region of the edge surface for transmission by the member along the path to a second region of the edge surface, includes polarizing means for linearly polarizing the light flux in a given direction to have rectangular vector components respectively parallel and perpendicular to the direction of the stress produced in the member, and the second means receives transmitted light flux from the second region of the edge surface of the member and detects changes in the respective rectangular components of the light flux received for providing the output signal.

36. The sensing means of claim 35 in which the second means includes light analyzing means receiving light flux from the first means and passing components of light flux which are in a predetermined direction.

37. The sensing means of claim 36 in which the polarizing means of the first means provides polarized light flux with equal rectangular components, and the analyzing means of the second means passes components of light flux which are in a direction transverse to the direction of light flux provided by the polarizing means of the first means.

38. The sensing means of claim 37 in which the source of light of the first means is a light emitting diode, and the second means includes a photocell detecting unit responsive to the light flux passed by the analyzing means for providing the output signal of the sensing means.

39. The sensing means of claim 37 in which the first means includes light transmitting fiber means for providing light flux from the source to the polarizing means for delivery through the member to the analyzing means of the second means.

40. The sensing means of claim 37 in which the first means includes first and second light transmitting fiber means, the first fiber means provides a first channel for the delivery of light flux from the source through the member to the analyzing means of the second means, and the second fiber means provides a second channel for delivery of light flux from the source to the second means for comparison with the light flux passed by the analyzing means of the second means.

41. The sensing means of claim 40 in which the first means provides pulses of light flux to the first and second fiber transmitting means for delivery by the first and second channels to the second means, and the second means compares the light flux of the pulses respectively delivered by the first and second channels for providing the output signal of the sensing means.

42. The sensing means of claim 41 which includes timing means for serially delivering to the second means a pair of pulses of light flux for each pulse of light flux provided by the first means by delaying the transmission by the respective channels of one of the pulses with respect to the other, and in which the second means includes a photocell detector unit for receiving and comparing each pair of pulses for providing the output signal of the sensing means.

43. The sensing means of claim 29, 35, 37 or 39 which includes phasing means positioned in the path of polarized light flux to the analyzing means shifting the phase of one of the components of the light flux with respect to the other.

44. The sensing means of claim 29, 35, 37 or 39 which includes phasing means comprising a quarter wave delay plate positioned in the path of polarized light flux to the analyzing means shifting the phase of one of the components of tne light flux with respect to the other.

* * * * *